Jan. 15, 1935.  H. F. MORRIS  1,988,045
ADVERTISING DISPLAY
Filed Feb. 20, 1934   2 Sheets-Sheet 1
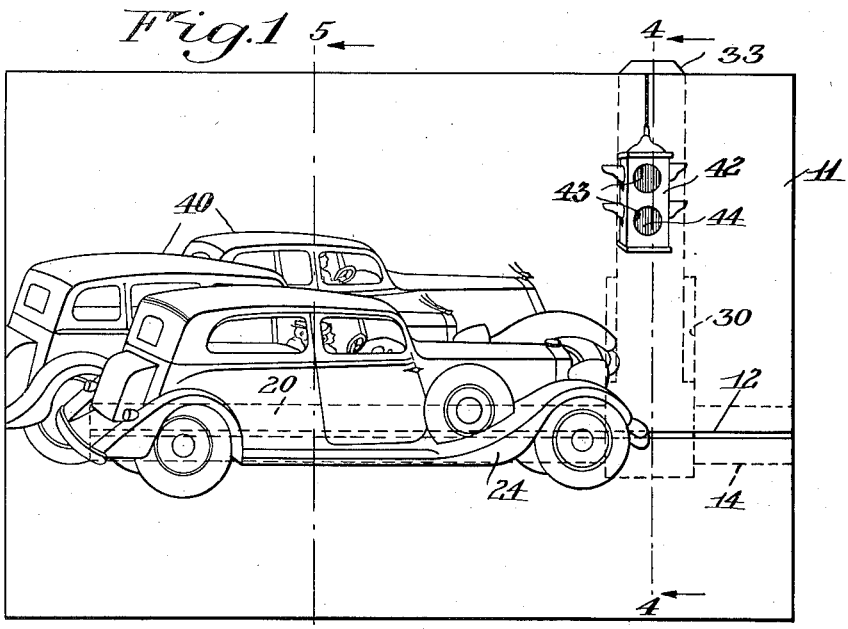
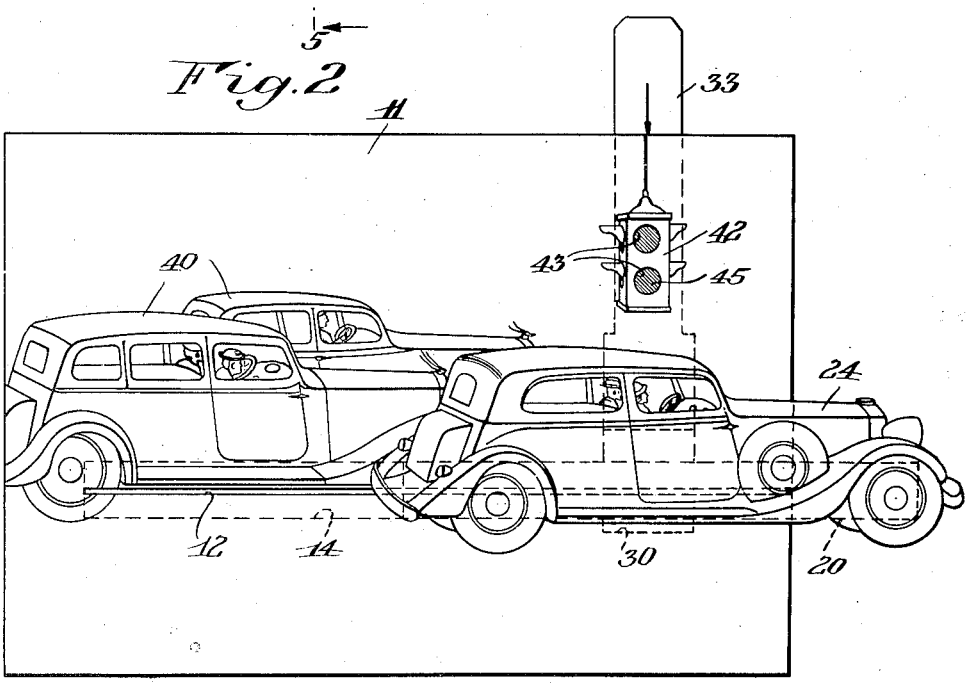
INVENTOR
BY Harvey F. Morris
Edward H. Dumpston
his ATTORNEY Jan. 15, 1935.   H. F. MORRIS   1,988,045
ADVERTISING DISPLAY
Filed Feb. 20, 1934   2 Sheets-Sheet 2
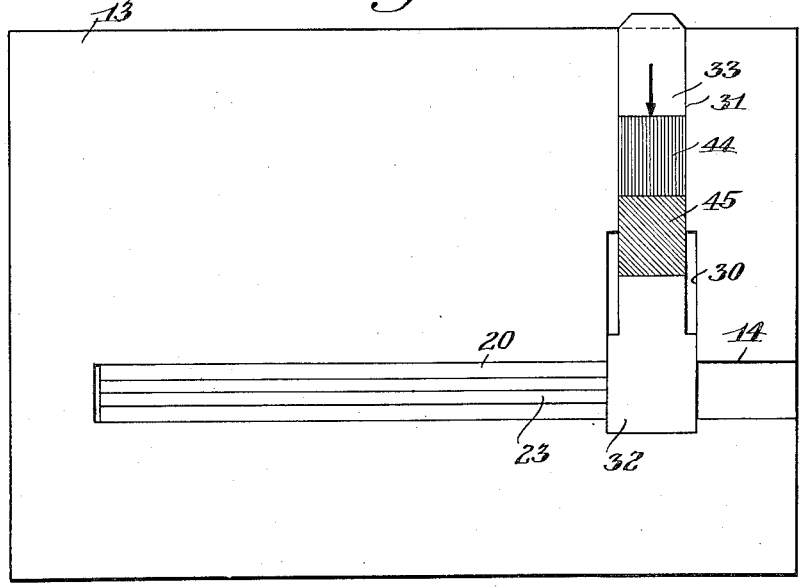
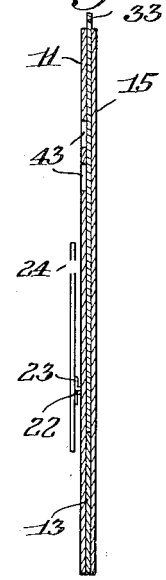
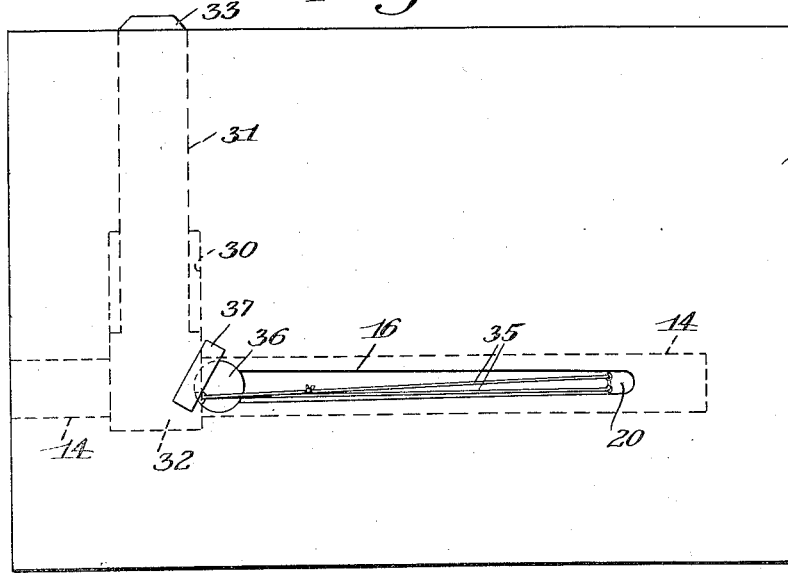
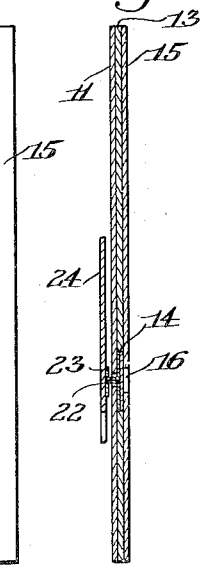
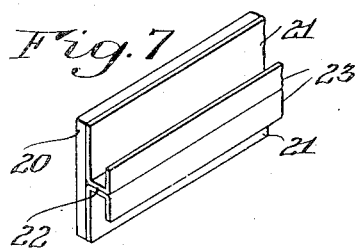
INVENTOR
BY Harvey F. Morris
Edward A. Cumpston
his ATTORNEY Patented Jan. 15, 1935

1,988,045

UNITED STATES PATENT OFFICE 1,988,045

ADVERTISING DISPLAY

Harvey F. Morris, Rochester, N. Y., assignor to The Case-Hoyt Corporation, Rochester, N. Y., a corporation of New York Application February 20, 1934, Serial No. 712,213

5 Claims. (Cl. 40—65)

This invention concerns an advertising display or device and has for its principal object the provision of an improved and novel display having features which will attract attention.

Another object is the provision of a device including relatively moving parts which have a surprise movement.

Still another object is the provision of a device so designed and constructed that it may be made easily and simply, and relatively inexpensively.

To these and other ends the invention resides in certain improvements and combinations of parts, all as will be hereinafter more fully described, the novel features being pointed out in the claims at the end of the specification.

In the drawings:

Fig. 1 is a front view of an advertising device constructed in accordance with a preferred embodiment of the invention, illustrating it in its normal set position;

Fig. 2 is a similar view showing the position of the parts after they have been released and movement has taken place;

Fig. 3 is a similar view with the front sheet removed in order to show the interior construction;

Fig. 4 is a vertical section taken substantially on the line 4—4 of Fig 1;

Fig. 5 is a vertical section taken substantially on the line 5—5 of Fig. 1;

Fig. 6 is a rear view of the device, and

Fig. 7 is a perspective view of a portion of the slide.

The same reference numerals throughout the several views indicate the same parts.

Referring now to the drawings, the simple and novel display of the present invention may conveniently be made up of a base formed of a rectangular front sheet 11 having a narrow slot 12 therein, a middle sheet 13 having a wider slot 14 therein, in alinement with the slot 12, and a back sheet 15 having therein a slot 16 which is narrower than the slot 14 but may be somewhat wider than the slot 12. The sheets may be fastened to each other by adhesive or otherwise.

Mounted for movement in the slots 12 and 14 is a slide, the construction of part of which is best shown in Fig. 7. It comprises, for example, a sheet 20 having two channel-like members 21 fixed thereto back to back, as plainly shown in Fig. 7, so that these members collectively form a web 22 which may extend through the narrow slot 12, as shown in Fig. 5, with the member 20 lying in and occupying substantially the full width of the slot 14. The flanges 23 then lie externally of the slot 12, at the front of the device, and attached to them is a member 24 lying on the front of the sheet 11 and carrying any suitable representation. The parts 20 to 24 inclusive form one integral assemblage which moves together in a direction longitudinally along the slots 12 and 14.

The middle sheet 13 is also provided with another slot extending approximately at a right angle to the slot 14. This other slot has a wide portion 30 and a narrower portion 31 extending up to the top of the device, and in this slot is slidably mounted a trigger member having a corresponding wide portion 32 and narrow portion 33, the latter part of which extends out from the top of the slot 31 to an accessible exterior position. The trigger member 33 is movable longitudinally along the slot, movement in a downward direction being limited by contact of the bottom of the member with the bottom of the slot 30, and movement in an upward direction being limited by contact of the shoulders at the upper end of the wider portion 32 of the trigger member with the upper end of the wider portion 30 of the slot.

When the trigger member 33 is in its normal set position, as shown in Figs. 1, 3, and 6, the lower end of the trigger member extends across the slot 14 and thus forms a removable abutment or stop preventing movement of the slide in one direction along the slot. If the trigger member be pulled upwardly to a position such as shown in Fig. 2, it is out of alinement with the slot 14 and thus no longer impedes movement of the slide, but on the contrary allows the slide to be moved longitudinally along the slots 12 and 14 under the influence of suitable resilient means.

The resilient means for moving the slide may comprise, for example, a rubber band 35 (Fig. 6) lying in the slot 16 and attached at one end to the slide (as by passing through suitable holes in the member 20) and at the other end to a suitable lug or ear 36 formed on the back plate 15. A small piece of sheet material 37 may overlie the lug 35 and part of the sheet 15 and be adhesively connected thereto to assist in holding the rubber band in place on the lug and in holding the lug in proper position on the sheet 15 after the band has been attached thereto.

In operation, the slide is set by pulling it against the tension of the rubber band 35 and then pressing the trigger down to its normal blocking position. Then if the accessible upper end of the trigger be pulled upwardly from the position shown in Fig. 1 to the position shown in Fig. 2, this will release the slide and the rubber band will give the slide a quick surprise movement, shifting it rapidly along the guiding slots to a position such as shown in Fig. 2. This quick surprise movement gives the device an interesting character which arrests the attention of the observer and thus makes it extremely valuable for advertising purposes. After the parts have been operated to the position shown in Fig. 2, they may easily be reset by moving the slide member 24 leftwardly from the position shown in Fig. 2 to its initial position shown in Fig. 1, and then pushing downwardly on the trigger member 33.

In the preferred embodiment here illustrated, the device is intended as an advertising display for a quick starting motor fuel, the construction being particularly suitable for advertising such a product, but not being limited in its usefulness to this field. For purposes of advertising motor fuel, the front surface of the front card 11 may have printed thereon any suitable picture of various motor vehicles, as indicated, for example, at 40, and the slide member 24 may itself be of the outline of a motor vehicle and have a picture of a vehicle printed thereon, as plainly shown in the drawings. Also the front surface of the card 11 may have a representation of a traffic signal 42 thereon, with one or more apertures 43 in the sheet, in the position usually occupied by the lens or lenses of the traffic signal. The trigger member may be colored to have a red portion 44 which shows through the apertures 43 when the trigger is depressed to its normal locking position, and a green portion 45 which shows through the apertures 43 when the trigger is pulled upwardly to its released position. Various wording advertising the desired motor fuel may be printed on the front face of the sheet 11.

When the display is constructed in this form just described, it is seen that a realistic advertising device of novel and interesting form is provided. When the parts are set, as in Fig. 1, the traffic light 42 is red. When the trigger 33 is pulled upwardly to the release position of Fig. 2, the traffic light changes from red to green and at the same time the representation of the automobile on the slide 24 darts forward rapidly under the influence of the rubber band 35, thus graphically portraying the exceptionally fast starting qualities of the motor fuel being advertised.

All of the parts of the device, except the rubber band 35, may be conveniently made from cardboard or paper suitably cut, folded, glued, and printed, so that it is seen that the construction is relatively inexpensive and easy to manufacture.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An advertising display comprising a base having guide means associated therewith, a slide movable back and forth along said guide means, trigger means displaceable laterally with respect to the direction of movement of said slide for limiting movement of said slide in one direction, and resilient means tending to move said slide suddenly along said guide means when the slide is released by said trigger means.

2. An advertising display comprising a base having a slot therein and also an aperture therein, slide means having a part overlying the front of said base and another part engaged in and slidable along said slot, trigger means within said base for holding said slide means against movement in one direction, said trigger means underlying and being observable through said aperture, and means tending to move said slide means in said one direction.

3. An advertising display comprising a laminated base including three pieces of superimposed sheet material forming a front layer, a middle layer, and a back layer, said middle layer having two slots therein at an angle to each other and said front layer having a slot therein narrower than and overlying one of said slots in said middle layer, slide means having a part overlying said front layer and another part passing through said slot in said front layer and into and slidable along said one of said slots of said middle layer, a trigger member slidable along the other one of said slots of said middle layer and extending to an accessible external position, said trigger member when in one position serving to block movement of said slide means in one direction, and resilient means tending to move said slide means in said one direction, so that when said trigger member is shifted to a non-blocking position, said resilient means will give said slide means a quick movement.

4. An advertising display comprising a laminated base including three pieces of superimposed sheet material forming a front layer, a middle layer, and a back layer, said middle layer having two slots therein at an angle to each other and said front layer having a slot therein narrower than and overlying one of said slots in said middle layer, slide means having a part overlying said front layer and another part passing through said slot in said front layer and into and slidable along said one of said slots of said middle layer, a trigger member slidable along the other one of said slots of said middle layer and extending to an accessible external position, said trigger member when in one position serving to block movement of said slide means in one direction, and rubber means connected at one end to said back layer and at the other end to said slide means, to tend to move said slide means in said one direction, so that when said trigger member is shifted to a non-blocking position, said rubber means will give said slide means a quick movement in said one direction.

5. An advertising display comprising a base having a slot therein and also an aperture therein, a representation of a traffic light surrounding said aperture, slide means having a part overlying the front of said base and forming a representation of a motor vehicle and another part engaged in and slidable along said slot, trigger means movable from a blocking position holding said slide means against movement in one direction to another non-blocking position, said trigger means having a red portion alined with and observable through said aperture when said trigger means is in said blocking position and a green portion alined with and observable through said aperture when said trigger means is in said non-blocking position, and resilient means tending to move said slide means in said one direction, so that when said trigger means is shifted from said blocking position to said non-blocking position the color observable through said traffic light aperture will change from red to green and said resilient means will cause said representation of a motor vehicle to move in said one direction.

HARVEY F. MORRIS.